United States Patent
Burke

(10) Patent No.: US 7,339,707 B2
(45) Date of Patent: Mar. 4, 2008

(54) METHOD AND SYSTEM FOR VIEWING A FAX DOCUMENT

(76) Inventor: James Burke, 14 North St., Old Bridge, NJ (US) 08857

( * ) Notice: Subject to any disclaimer, the term of this patent is extended or adjusted under 35 U.S.C. 154(b) by 909 days.

(21) Appl. No.: 10/443,740

(22) Filed: May 23, 2003

(65) Prior Publication Data

US 2004/0120016 A1 Jun. 24, 2004

Related U.S. Application Data

(60) Provisional application No. 60/434,431, filed on Dec. 19, 2002.

(51) Int. Cl.
*H04N 1/40* (2006.01)
*H04N 1/23* (2006.01)
*H04N 1/00* (2006.01)

(52) U.S. Cl. ............... 358/446; 358/296; 358/437; 358/445

(58) Field of Classification Search ............ 358/400, 358/296, 500, 403, 445, 437, 402, 446; 382/135, 382/7, 140; 347/43; 342/185; 379/100.01; 710/65
See application file for complete search history.

(56) References Cited

U.S. PATENT DOCUMENTS

| | | | |
|---|---|---|---|
| 4,010,466 A | 3/1977 | Hofstein | 342/185 |
| 4,769,719 A | 9/1988 | Endo | 358/296 |
| 4,888,812 A | 12/1989 | Dinan et al. | 382/7 |
| 5,127,047 A | 6/1992 | Bell et al. | 379/100 |
| 5,170,252 A | 12/1992 | Gear et al. | 348/649 |
| 5,333,068 A | 7/1994 | Sakai et al. | 358/500 |
| 5,546,194 A | 8/1996 | Ross | 358/445 |
| 5,602,936 A | 2/1997 | Green et al. | 382/140 |
| 5,822,084 A | 10/1998 | Hwang | 358/437 |
| 5,872,637 A | 2/1999 | Nakanishi | 358/403 |
| 6,088,127 A | 7/2000 | Pieterse | 358/407 |
| 6,181,837 B1 | 1/2001 | Cahill et al. | 382/305 |
| 6,363,164 B1 | 3/2002 | Jones et al. | 382/135 |
| 6,594,351 B1 | 7/2003 | Bhogal et al. | 379/100.01 |
| 6,603,569 B1 | 8/2003 | Johnson, Jr. et al. | 358/1.15 |
| 6,675,241 B1 | 1/2004 | Hunter | 710/65 |
| 6,707,580 B1 | 3/2004 | Bloomfield | 358/402 |
| 6,721,803 B1 | 4/2004 | Kirkeby | 709/246 |
| 6,748,057 B2 | 6/2004 | Ranalli et al. | 379/88.17 |
| 6,873,715 B2 * | 3/2005 | Kuo et al. | 382/119 |
| 2002/0033901 A1 * | 3/2002 | Martin | 348/699 |
| 2002/0039359 A1 * | 4/2002 | Gerszberg et al. | 370/354 |
| 2002/0085745 A1 | 7/2002 | Jones et al. | 382/135 |
| 2002/0101620 A1 * | 8/2002 | Sharif et al. | 358/400 |

(Continued)

*Primary Examiner*—Houshang Safaipour
(74) *Attorney, Agent, or Firm*—Richard C. Litman

(57) ABSTRACT

A system and method for viewing a fax document includes a fax device which may be configured for transmitting/receiving fax transmissions. When a transmitting fax device with a video camera and a video display transmits a fax transmission to a receiving fax device with a video camera and a video display, and the receiving fax device receives the fax transmission, the transmitting fax device controls the receiving fax device until the fax transmission ends. An image of the fax transmission may then be previewed on the transmitting fax device, the fax transmission may then be electronically released from the receiving fax device, and an image of the fax transmission may then be printed. The video camera of the receiving fax device may then scan the printed image, display the scanned printed image, and physically release the scanned printed document from the receiving fax device.

68 Claims, 3 Drawing Sheets

U.S. PATENT DOCUMENTS

| | | | |
|---|---|---|---|
| 2002/0140799 A1* | 10/2002 | Shinozaki et al. | 347/218 |
| 2002/0149644 A1 | 10/2002 | Jodra et al. | 347/43 |
| 2003/0117480 A1* | 6/2003 | Shiraiwa | 347/212 |
| 2003/0202317 A1* | 10/2003 | Jans | 361/683 |

* cited by examiner

METHOD AND SYSTEM FOR VIEWING A FAX DOCUMENT

CROSS REFERENCE TO RELATED APPLICATIONS

This application claims priority to provisional application Ser. No. 60/434,431, filed Dec. 19, 2002, which is incorporated herein by reference.

BACKGROUND OF THE INVENTION

1. Field of the Invention

The present invention relates generally to a facsimile (fax) machine, and, more particularly, to a fax machine integrally fitted with an operating video camera, a sealed document chamber, and simultaneous remote video transmission capabilities that enable a sender of a document to the fax machine, to view, and approve or disapprove, of a fax of the document that is generated by the fax machine.

2. Description of the Related Art

Financial institutions, and business and government agencies of various types have always needed to have the capability to electronically transmit documents under conditions of security and controlled receipt confirmation. The ability to accurately and securely transmit electronic signature approvals, classified documents, certified records, copies of financial instruments and funding authorizations is essential for the functioning of all major modern institutions. As communications technologies have advanced over the years, various systems and methods have been devised to support secure document transmissions and transmission receipt confirmations. From the telegraph, to the telephone, to various radio systems and their modern high capacity digital embodiments and hybrids, document reproduction under conditions of security has been accomplished by integrating the most reliable and acceptable communications technologies with the best security management practices.

A widely used method of document transmission has been the fax. As the name implies, a fax is a reproduction of the actual original document. The object of a fax is to create a remote copy that is identical in all material aspects carries the authority of the original document. The use of fax generating machines actually predates the wide spread use of the telegraph when in 1843, Alexander Bain of England devised an apparatus consisting of two pens connected to two pendulums, which in turn were joined to a wire, that was able to reproduce writing on an electrically conductive surface. In 1925, Eduouard Belin of France invented a method of using light beams and photoelectric cells that could convert light, or the absence of light, into transmittable electrical impulses. This is the basic principle upon which all modern fax machines operate. The invention of smaller and more efficient semiconductor components for electronic equipment eventually led to the creation of smaller and faster light based fax machines in the 1970s and 1980s. More recently, the fax machine has become associated with the regular transmission of documents over public and private telephone networks as a normal part of conducting daily business. Modern fax machines use bi-directional digital communications signals represented as analog audio tones to traverse the public networks. Fax transmission techniques use protocols or digital signaling methods that are compatible with modern data processing and computer systems. This makes it possible for modern computer modems (modulator/demodulators) to support data communications between computers and fax machines. The standards that govern the international interoperability of modern fax systems are set and governed by the Comite Consultatif International Telephonique et Telegraphique (CCITT) more recently known as the International Telecommunications Union (ITU) Group 3 protocol specifying a transmission rate at the fax of 9,600 bits per second.

Security for received documents is usually accomplished through the use of manual procedures, such as the posting of a staff member (or guard) by the fax machine when a sensitive document is expected, or the placement of the fax machine within a physically secure facility or room. Electronic security is accomplished through the use of access codes that can be programmed into the receiving buffer of some fax machines. Receipt confirmation again, is usually accomplished through the use of staff members or electronically by the generation of a Simple Mail Transport Protocol (SMTP) message reply by the fax machine itself. In the case of the electronic reply, the confirmation indicates a completed transmission only with no indication of received message legibility.

In addition to the fax method of remote document reproduction as a means for transmitting secure documents, methods of video document image processing have been proposed. As video cameras have become smaller and have gained the ability to produce higher quality images, individual documents or series of documents can be photographed and the images digitized and stored in databases, or transmitted to remote locations as needed using either the existing public telephone network or newer high speed private networks. Authoritative paper versions of these images can then be generated locally by fax or printer using the standard print devices associated with the local storage media. Data processing and network security devices and systems, such as passwords, access codes, physical key locks, intrusion alarms, network firewalls, network restrictions, and message blocking software as used for the host devices, can serve to secure the delivery of stored or transmitted image data. The image processed documents residing within protected databases requiring access and index selection procedures are inherently more secure than faxed paper documents. Receipt confirmation options are available via the particular host system's messaging capabilities. In order to provide financial institutions, and businesses and governments with the highest level of security and with absolute document receipt confirmation, a fax or image-processing device that can transfer authoritative copies of the most sensitive documents is needed. A device that allows the originator or sender of the document to positively verify that the document he sent is identical to the document received at the targeted fax machine. A number of these devices and methods have been proposed for use.

The related art is represented by the following references of interest.

U.S. Pat. No. 4,769,719, issued on Sep. 6, 1988 to Etsuro Endo, describes a fax system with a memory unit for storing video information read from a document that is laser scanned on the receiving side that then enables the transmitting side to confirm transmission receipt. As the transmitting side demands a recording confirmation response, the receiving side prepares its response confirming the receipt of the document. A fax master controller serves to coordinate the communications, print, and video operations between both the sending and receiving machines. U.S. Patent Application Publication No. 2002/01016201 A1, issued on Aug. 1, 2002 to Imran Sharif et al., describes a paperless fax-compatible Internet appliance that connects to the public network utilizing both data and fax protocols. Sharif et al.

provides a video section including a video signal output for outputting video signals to be displayed on a video display, and a processing unit which controls the network connection section and the video section to generate video signals for displaying received fax messages on the video display. U.S. Pat. No. 5,602,936, issued on Feb. 11, 1997 to W. Thomas Green et al., discloses a method and an apparatus for recapturing data from scanning devices and storing the captured image data in digital form using a method that allows for fast and reliable access for viewing, printing and transmitting. The imaged data file resides on secure databases until an authorized user selects the image based on a set of logical indexes. In the case of checks, for example, this might be the account number, check number and amount. U.S. Pat. No. 4,888,812, issued on Dec. 19, 1989 to Raymond F. Dinan et al., describes a document image processing system that converts optically perceptible data, such as the name and account numbers on checks, into a video image. This video image is then compressed and transmitted to a mass storage device for later retrieval. Sensors monitor the quality of the image data in real time with provisions for generating a signal that can be used for immediately stopping the generation of an image file of unacceptable quality.

U.S. Pat. No. 6,181,837, issued on Jan. 30, 2001 to Thomas Cahill et al., describes a method and an apparatus for storing and retrieving images of documents (e.g., checks). The method involves the placement of a plurality of checks in an electronic imaging machine that creates digitized images of the pertinent information on the checks. This information is then transmitted to a mass storage file for later retrieval using a personal computer (PC) based workstation. U.S. Pat. No. 6,363,164, issued on Mar. 26, 2002 to John E. Jones et al., describes a document processing method whereby a full document (e.g., currency) image scanner and discriminator unit obtains a full video image of a transmitted document. The discrimination unit includes the means for authenticating the document based on criteria stored in a remote database.

Other patents describing devices or systems for transmitting and approving secure image file documents include U.S. Patent Application Publication No. 2002/0085745 A1, published on Jul. 4, 2002 to John E. Jones et al. (automated document processing system with full image scanning); U.S. Patent Application Publication No. 2002/0149644 A1, published on Oct. 17, 2002 to Rodolfo Jodra et al. (a proofing data file generator); U.S. Pat. No. 4,010,466, issued on Mar. 1, 1977 to Steven R. Hofstein (method and system for electronic storage display); U.S. Pat. No. 5,872,637, issued on Feb. 16, 1999 to Hiroyuki Nakanishi (an image communication system and apparatus, in which data stored in a memory are accessible in a convenient manner from a remote location); and U.S. Pat. No. 5,333,068, issued on Jul. 26, 1994 to Masamori Sakai et al. (a wire message image processing and reproducing apparatus).

None of the above inventions and patents, taken either singularly or in combination, is seen to describe the instant invention as claimed.

SUMMARY OF THE INVENTION

The present invention is a system and method for viewing a fax document that includes a fax device which may be configured for transmitting and/or receiving fax transmissions. When a transmitting fax device with a video camera and a video display is communicatively interconnected for a transaction with a receiving fax device with a video camera and a video display, the transmitting fax device transmits a fax transmission to the receiving fax device, and the receiving fax device receives the fax transmission, the transmitting fax device controls the receiving fax device until the transaction of transmitting the fax transmission ends. An image of the fax transmission may then be previewed on the video display of the transmitting fax device.

The transmitting fax device may then electronically release the fax transmission from the receiving fax device after the image of the fax transmission has been previewed on the transmitting fax device. An image of the fax transmission may then be printed at the receiving fax device after the fax transmission is electronically released. The printed image of the fax transmission may then be scanned with the video camera of the receiving fax device. An image of the scanned printed image of the first fax transmission may then be displayed on the video display of the transmitting fax device. The scanned printed image may then be physically released from the receiving fax device to enable a user to hold the scanned printed document after previewing the image of the scanned printed image of the fax transmission on the transmitting fax device. A computer may also be interconnecting to the transmitting fax device, and may control functions of the transmitting fax device.

Accordingly, it is a principal aspect of the invention to provide a fax device including a video camera operable to scan a printed document of a fax transmission; a signature touch pad operable to provide an electronic signature to a fax transmission; a reception container operable to receive a printed image of a received fax transmission, the reception container having a transparent cover and being sealed to users; and a video display operable to display an image of a fax transmission before the fax transmission is released to an addressee of the fax transmission.

It is a further aspect of the invention to provide a fax device including a video camera operable to scan a printed image of a fax transmission; a signature touch pad operable to provide an electronic signature to a fax transmission; a reception container operable to receive a printed image of a received fax transmission, the reception container having a transparent cover and being sealed to users; and a video display operable to display an image of a fax transmission before the fax transmission is released to an addressee of the fax transmission; wherein the video display for the fax device is operable to display a fax transmission when the fax transmission is transmitted by the fax device and before an image of the fax transmission is printed.

It is another aspect of the invention to provide a fax system with a first fax device that includes a video camera operable to scan a printed document of a fax transmission; a signature touch pad operable to provide an electronic signature to a fax transmission; a reception container operable to receive a printed image of a received fax transmission, the reception container having a transparent cover and being sealed to users; and a video display operable to display an image of a fax transmission before the fax transmission is released to an addressee of the fax transmission; and a second fax device communicatively interconnected with the first fax device, the second fax device including a video camera operable to scan a printed image of a fax transmission; a signature touch pad operable to provide an electronic signature to an image of a fax transmission; a reception container operable to receive a printed image of a received fax transmission, the reception container having a transparent cover and being sealed to users; and a video display operable to display an image of a fax transmission before the fax transmission is released to an addressee of the fax transmission; wherein the first fax device controls functions of the second fax device when the first fax device sends a fax transmission to the second fax device, and the second fax device controls functions of the first fax device when the second fax device sends a fax transmission to the first fax device.

Yet another aspect of the invention is to provide a method for viewing a fax document that provides a first fax device with a video camera and a video display; provides a second fax device with a video camera and a video display; communicatively interconnects the first fax device with the second fax device for a transaction; transmits a fax transmission from the first fax device to the second fax device; receives the fax transmission at the second fax device; controls the second fax device with the first fax device until the transaction of transmitting the fax transmission ends; previews an image of the first fax transmission on the video display of the first fax device; and electronically releases the fax transmission from the second fax device to an addressee of the fax transmission after previewing the image of the fax transmission on the first fax device.

Still another aspect of the invention is to provide a method for viewing a fax document that provides a first fax device with a video camera and a video display; provides a second fax device with a video camera and a video display; communicatively interconnects the first fax device with the second fax device for a transaction; transmits a fax transmission from the first fax device to the second fax device; receives the fax transmission at the second fax device; controls the second fax device with the first fax device until the transaction of transmitting the fax transmission ends; previews an image of the fax transmission on the video display of the first fax device; electronically releases the fax transmission from the second fax device to an addressee of the fax transmission after previewing the image of the fax transmission on the first fax device; prints a document of the fax transmission at the second fax device after electronically releasing the fax transmission; scans the printed document of the fax transmission with the video camera of the second fax device; displays the scanned printed document of the fax transmission on the video display of the first fax device; and physically releases the fax transmission from the second fax device after previewing the image of the scanned printed document of the fax transmission on the first fax device.

Yet another aspect of the invention to provide a method for viewing a fax document that provides a first fax device with a video camera and a video display; provides a second fax device with a video camera and a video display; communicatively interconnects the first fax device with the second fax device for a transaction; transmits a fax transmission from the first fax device to the second fax device; receives the fax transmission at the second fax device; controls the second fax device with the first fax device until the transaction of transmitting the fax transmission ends; previews an image of the fax transmission on the video display of the first fax device; electronically releases the fax transmission from the second fax device to an addressee of the fax transmission after previewing the image of the fax transmission on the first fax device; and electronically signs the fax transmission after previewing the image of the fax transmission and before electronically releasing the fax transmission.

Still another aspect of the invention to provide a method for viewing a fax document that provides a first fax device with a video camera and a video display; provides a second fax device with a video camera and a video display; communicatively interconnects the first fax device with the second fax device for a transaction; transmits a fax transmission from the first fax device to the second fax device; receives the fax transmission at the second fax device; controls the second fax device with the first fax device until the transaction of transmitting the fax transmission ends; previews an image of the fax transmission on the video display of the first fax device; electronically releases the fax transmission from the second fax device to an addressee of the fax transmission after previewing the image of the fax transmission on the video display of the first fax device; interconnects a computer to the first fax device; and controls functions of the first fax device with the computer.

It is an aspect of the invention to provide improved elements and arrangements thereof for a system and method for viewing fax documents for the purposes described which are inexpensive, dependable and fully effective in accomplishing their intended purposes.

These and other aspects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
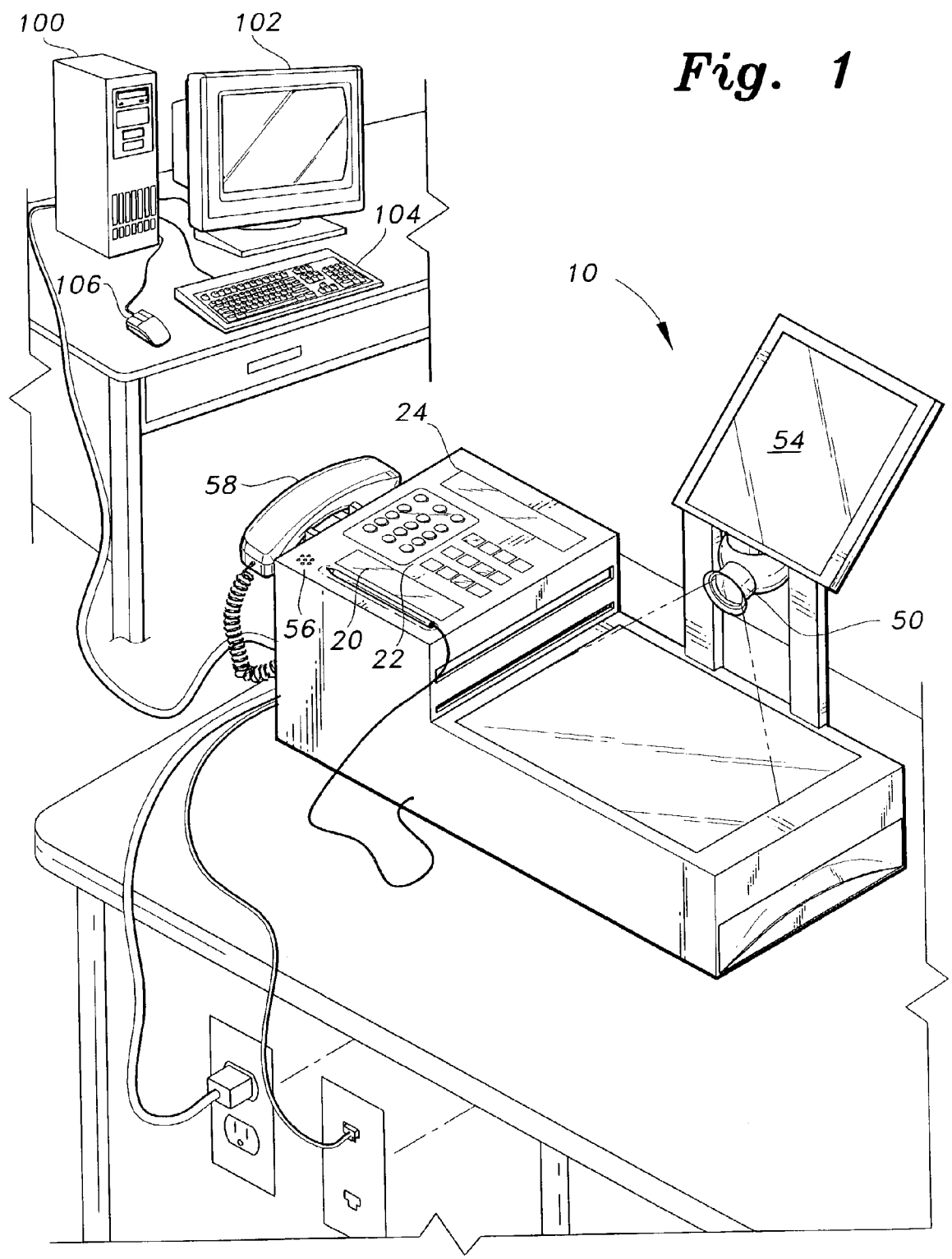
FIG. 1 is an environmental, perspective view of a system for viewing a fax document according to the present invention.

The present invention is a system and method for viewing a fax document. The invention disclosed herein is, of course, susceptible of embodiment in many different forms. Shown in the drawings and described herein below in detail are preferred embodiments of the invention. It is to be understood, however, that the present disclosure is an exemplification of the principles of the invention and does not limit the invention to the illustrated embodiments.

Figure 2:
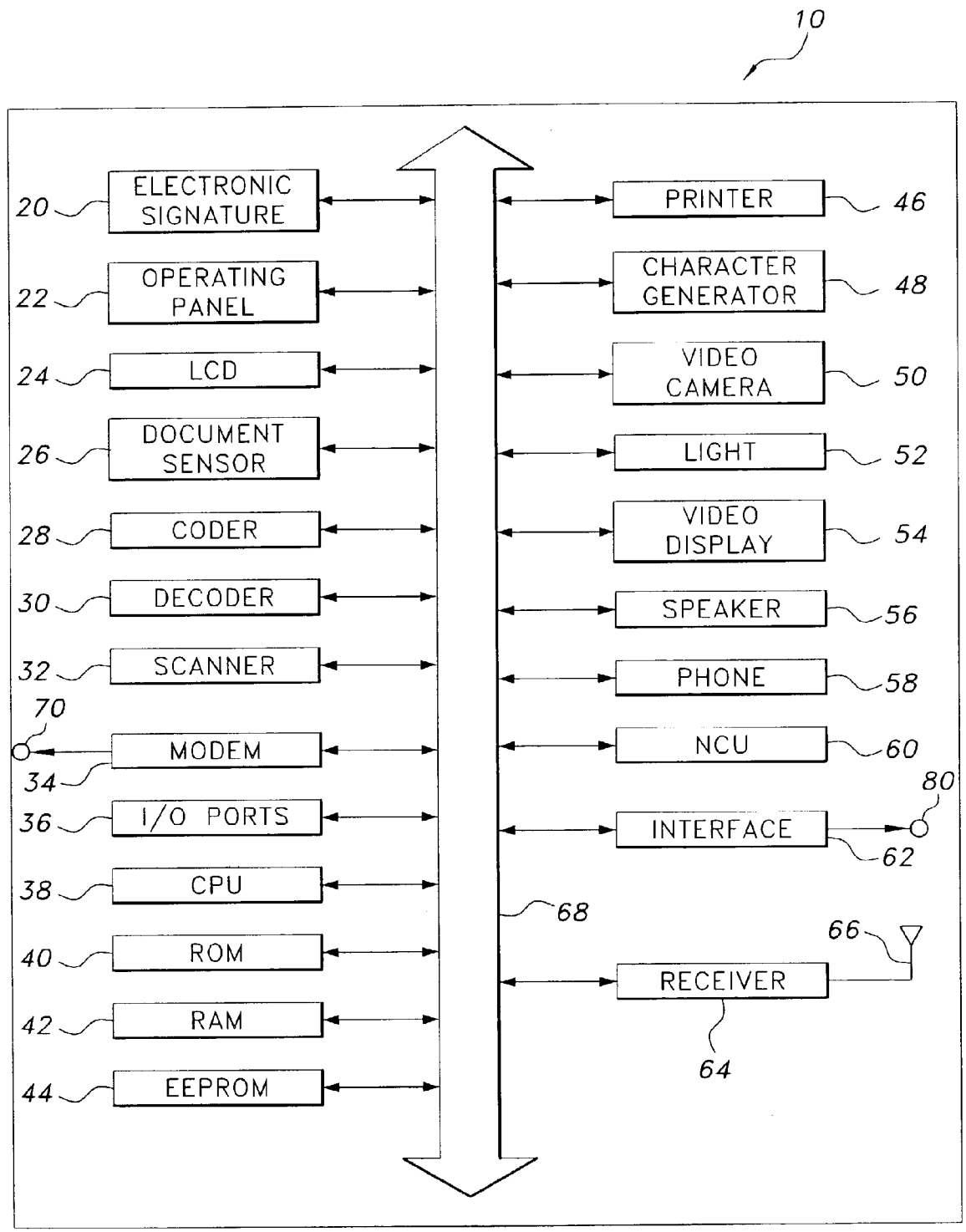
FIG. 2 is a block diagram of a fax device for viewing a fax document according to the present invention.

Referring to the drawings, FIGS. 1 and 2 illustrate a fax device 10 configured for viewing a fax document according to the invention. A conventional fax machine may also be retrofitted so as to be configured for viewing a fax document according to the invention. Fax device 10 may be configured for transmitting and/or receiving fax transmissions. When a user (sender) transmits a fax transmission of an electronic document or scanned physical document, which may be critical or sensitive, from a transmitting fax device 10 to a receiving fax device 10, the sender of the fax transmission may preview an electronic image of the fax transmission, and either approve or disapprove the fax transmission based on the previewed electronic image of the fax transmission, prior to 'electronically releasing' the fax transmission.

Electronically releasing the fax transmission, as used herein, refers to releasing control of an electronic image of a received fax transmission from the transmitting fax device 10 to the receiving fax device 10. Once the fax transmission is electronically released by the sender at the transmitting fax device 10, the sender may then 'physically release' the fax transmission. Physically releasing the fax transmission, as used herein, refers to releasing control of a printed image of the fax transmission to the receiving fax device 10 to enable a user at the receiving fax device 10 to physically hold the printed image of the fax transmission.

In other words, the sender of a fax transmission maintains control of the fax transmission from the transmitting fax device 10 prior to electronically releasing the fax transmission to the receiving fax device. Once an image of the fax transmission has been printed at the receiving fax device 10, the sender of the fax transmission maintains control of access to the printed image of the fax transmission, prior to physically releasing, e.g., releasing control of the printed image of the fax transmission, to the receiving fax device 10. The user (receiver) of the receiving fax device 10 may also maintain electronic and/or physical control of the fax transmission at the receiving fax device 10 after the sender of the fax transmission has electronically and/or physically released control of the fax transmission. Fax device 10 also enables the sender and/or receiver of a fax transmission to electronically sign an electronic or printed version of the fax transmission at the respective transmitting or receiving fax device 10 after previewing and prior to electronically and/or physically releasing the fax transmission.

Fax device 10 is communicatively interconnected to a telephone line, and electrically interconnected to a power line, such as a utility line or the like. Fax device 10 may also be communicatively interconnected with one or more computers 100, each including a monitor 102, keyboard 104, mouse 106, etc. Fax device 10 is powered by normal commercial or residential office distribution power 20 and is connected to the office or residential voice telephony and/or Local Area Network/Wide Area Network (LAN/WAN) system. Fax device 10 may include any number of usual features found on conventional fax devices, such as a telephone handset 58, a keypad with liquid crystal display (LCD) controls 22, and any type of display 24, such as an LCD display, an organic LCD display, a light emitting diode (LED) display, an organic LED display (OLED), a thin film transistor display, a cathode ray tube (CRT) display, a plasma video display, or the like. Fax device 10 may also include a sealed transparent document reception holder, a video camera 50, and a light 52 trained on the entire document reception holder, and any type of video display 54, such as a cathode ray tube display, a liquid crystal display, a plasma video display, or the like. The fax device 10 may be configured for being accessed via a LAN/WAN or other universal data port 80 (see FIG. 2) by a PC or other similar device for programming, control, and document view. Conventionally, fax device 10 is operable to compress, decompress, and transport a fax transmission received by the fax device to a video display 54 of a fax device that provided the fax transmission.

In FIG. 2, fax device 10 is shown to include an electronic signature touch pad 20, an operating panel 22, an LCD 24, a document sensor 26, a coder 28, a decoder 30, a scanner 32, a modem 34, input/output ports 36, a central processing unit (CPU) 38, a read only memory (ROM) 40, a ready access memory (RAM) 42, an electrically eraseable and programmable read only memory (EEPROM) 44, a printer 46, a character generator 48, a video camera 50, a light 52, a video display 54, a speaker 56, a phone 58, a network control unit (NCU) 60, a PC interface 62, receiver 64, and an antenna 66. Fax device 10 may optionally include a bar code reader, an auxiliary paper tray, and a network card for connecting to a LAN, a WAN, or the like. These elements are all communicatively interconnected with a communication bus 68. These elements are generally well known and any type of element may be used according to the desires of the user. Fax device 10 may optionally have a network card for connecting to a local area network, a bar code reader (not shown) and an auxiliary paper tray (not shown).

As incoming fax transmissions are received, the video camera 50 scans and records an image of each incoming fax transmission of the receiving device 10 after the images of the incoming fax transmissions have been printed, and enables a user (receiver) of the receiving fax device 10 to preview via a video display 54 of the receiving fax device 10 and/or electronically sign an image of the fax transmission at the receiving fax device 10 via the signature touch pad 20. As images of the incoming fax transmissions are received on the receiving fax device 10, the sender of the incoming fax transmission is also able to preview an image of the incoming fax transmission via a video display 54 on a transmitting fax device 10, and either approve or disapprove, the image of the transmission prior to electronically and/or physically releasing an image of the fax transmission at the receiving fax device 10, e.g., by printing and/or transmitting electronically to a receiver's PC. The video camera 50 of the receiving fax device 10 scans images of incoming fax transmissions through a transparent cover of a receiving paper tray.

When a call from the sender of a fax transmission for the transmitting fax device 10 is received at the receiving fax device 10, the video camera 50 on the receiving fax device 10 activates, and the sender is able to preview an image of the fax transmission on the video display 54 of the transmitting fax device 10 or a PC interconnected with the transmitting fax device 10. The sender is also able to record an image of the fax transmission on memory of the transmitting fax device 10 or on a PC interconnected with the transmitting fax device 10. For check (money) fax transmissions, the sender is able to view a check tracking number off the face of a fax-a-check form for the check that may be used by the sender to enter the tracking number of the check to initiate a fax transmission.

The signature touch pad 20 includes an electromagnetic digitizer that provides uncompressed and/or compressed digital signature signals to be generated, transmitted, and printed on an image of the fax transmission. The signature touch pad 20 includes a top portion and a bottom portion. The signature touch pad 20 may include an alignment guide to properly position a signature generated by a user of the signature touch pad 20 to properly position the signature on an image of the fax transmission. A signature touch pad stylus may be used to sign the signature touch pad 20. The stylus includes electronic circuitry and forms a part of the digitizer circuit. The stylus is connected to the signature touch pad by a stylus cable. When the stylus is not in use, it may be stored in an appropriately configured receptacle.

A sender may preview an image of a sent fax transmission on a sender's fax device 10 prior to electronically and/or physically releasing the sent fax transmission by electronically transmitting the sent fax transmission to a PC interconnected with the receiver's fax device 10 or physically releasing a printed image of the fax transmission. A sender may also provide his/her signature at a fax device 10 at a remote location by signing the signature touch pad 20 at the sender's fax device 10 after a fax transmission has been sent to the fax device 10 at the remote location, and after the sender has previewed the image of the fax transmission at the video display 54 on the sender's fax device 10. A sender may also preview an image of the fax transmission after having signed an image of the fax transmission using the signature touch pad at the sender's fax device 10, and prior to electronically and/or physically releasing the fax transmission at the receiver's fax device 10.

A receiver may preview an image of a sent fax transmission at the receiver's fax device 10 prior to electronically and/or physically releasing the sent fax transmission by electronically transmitting the sent fax transmission to a PC interconnected with the receiver's fax device 10, or by printing an image of the fax transmission. A receiver may provide his/her signature at his/her location by signing the signature touch pad 20 at the receiver's fax device 10 after a fax transmission has been sent to the receiver's fax device 10, and after the receiver has previewed the image of the fax transmission at the video display on the receiver's fax device 10. A receiver may also preview an image of the fax transmission after having signed an image of the fax transmission using the signature touch pad at the receiver's fax device 10, and prior to the electronic and/or physical release of the fax transmission at the receiver's fax device 10.

When an image of a fax transmission is printed after the fax transmission has been electronically released from the sender's fax device 10, the printed image of the fax transmission is located under the transparent cover above the document. The printed image of the fax transmission may also be viewed prior to signing by either the sender and/or the receiver. When a sender and/or receiver decides to sign a printed image of a fax transmission after the image of the fax transmission is printed, the sender and/or receiver may cause the faxed document to scroll to a position under the imager/printer, or the imager/printer may travel over the faxed document to be signed to a desired location for printing a previously stored or immediately executed signature of a sender and/or receiver.

When a transmitting fax device 10 or retrofitted equivalent fax machine is communicatively connected with a receiving fax device 10 or a retrofitted equivalent fax machine, the transmitting fax device 10 controls all functions of the receiving fax device 10, and the operating panel 22 of the receiving fax device 10 becomes inoperative. This provides security for the sender by enabling the complete preview, check, double check, approve and/or disapprove of a fax transmission by the sender before eventual electronic and/or physical release of the fax transmission at the receiving fax device 10 without any possible interference by individuals in the presence of the receiving fax device 10 until the transmitting fax device 10 ends the transaction.

Fax device 10 includes FAX VIEW A DOCUMENT software stored in memory 40, 44 of fax device 10 that enables fax device 10 to execute any function described herein. The FAX VIEW A DOCUMENT software includes a plurality of fax device instructions which may be stored and/or transferred to memory 40, 44 from an external memory device (e.g., a floppy disk, a CD, or the like) through PC interface 62. The fax device software is read and processed by CPU 38, and causes CPU 38 to perform programmed functions. Movement and process of instructions as well as data is controlled and accomplished by CPU 38. The FAX VIEW A DOCUMENT software includes instructions for causing CPU 38 to operate in a variety of modes. For example, when an operator faxes a document from fax device 10 to a remote fax device, the FAX VIEW A DOCUMENT software causes CPU 38 to operate in a VIEW A DOCUMENT (VAD) mode, where CPU 38 subsequently recognizes message content information. The VAD mode enables fax device 10 to determine whether the sender of a fax transmission requires previewing of an image of the fax transmission prior to electronically and/or physically releasing delivering the fax transmission to a receiving fax device 10. The FAX VIEW A DOCUMENT software may also cause CPU 38 to operate in a FAX A CHECK mode, a CONTRACT mode, a PARTY LINE mode, a REGISTERED RECEIPT REQUESTED mode, a CARBON COPY mode, and/or any other modes configured according to the desires of the user. In addition, a PC may be configured with the FAX VIEW A DOCUMENT software stored therein so that when the PC is communicatively interconnected with the fax device 10 when fax transmissions are being sent from fax device 10, the PC may be configured to control the functions of fax device 10.

When a transmitting fax device 10 or retrofitted equivalent fax machine is communicatively connected with a receiving fax device 10 or a retrofitted equivalent fax machine, and the transmitting fax device 10 is set to CONTRACT mode, the CONTRACT mode enables a sender and a receiver of a fax transmission of a contract, agreement, understanding, or the like, requiring signatures from both parties (e.g., the sender and the receiver) to view the signatures of the sender and the receiver at transmitting and receiving fax devices 10 at both ends of the fax transmission. The CONTRACT mode may also enable both the sender and the receiver to print out duplicate copies of the executed contract, agreement, understanding, or the like (e.g., signed by both parties), and enable both the sender and the receiver to view the printed out duplicate copies of the executed contract, agreement, understanding, or the like. The CONTRACT mode may also be used in conjunction with the PARTY LINE mode to enable the transmitting fax device 10 to be communicatively connected to plural receiving fax devices 10 via a party line (e.g., similar to when a conference call is placed on a telephone so a caller can communicate with plural individuals/parties at different telephone numbers). In the case of multiple transmitting and receiving fax devices 10 communicatively interconnected in CONTRACT mode and PARTY LINE mode, each transmitting and receiving fax device 10 may be configured with split screen technology to enable each participating party to view the electronic and/or printed images of a fax transmission of a contract, agreement, understanding, or the like that is present at the location of each participating party.

When the transmitting fax device 10 is set to CONTRACT mode, and the sender has sent the fax transmission of the contract, agreement, understanding, or the like, to the receiver at the receiving fax device 10, the fax transmission of the contract, agreement, understanding, or the like, is sent back to the sending fax device 10 to enable the fax transmission to be electronically and/or physically released at both the sending fax device 10 and the receiving fax device 10. Both the sender and the receiver may preview an image of the sent fax transmission of the contract, agreement, understanding, or the like, on the display 24 of the respective sending/receiving fax devices 10 prior to the electronic and/or physical releases or the sent fax transmission of the contract, agreement, understanding or the like. Both the sender and the receiver of the fax transmission of the contract, agreement, understanding, or the like, may also provide their signatures to the fax transmission of the contract by signing the signature touch pad 20 at their respective transmitting/receiving fax devices 10 after the fax transmission of the contract, agreement, understanding, or the like, has been sent to the receiving fax device 10, and after the sender/receiver has previewed, preferably via split screen technology, the image of the fax transmission at the video display 54 on the respective transmitting/receiving fax devices 10. Both the sender and receiver may also preview an image of the fax transmission after having signed an image of the fax transmission of the contract, agreement, understanding, or the like, using the signature touch pad at their respective transmitting/receiving fax devices 10, and prior to electronically and/or physically releasing the fax transmission at their respective transmitting/receiving fax devices 10.

When an image of a fax transmission of the contract, agreement, understanding, or the like, is printed at both of the transmitting/receiving fax devices 10 after the fax transmission has been electronically released from the transmitting fax device 10, the printed image of the fax transmission is located under the transparent cover above the document at both of the transmitting/receiving fax devices 10. The printed image of the contract, agreement, understanding, or the like, may also be viewed prior to signing by either the sender and/or the receiver. When a sender and/or receiver decides to sign the printed image of the contract, agreement, understanding, or the like, after the image of the fax transmission of the contract, agreement, understanding, or the like, is printed, the sender and/or receiver may cause the printed image of the contract, agreement, understanding, or the like, to scroll to a position under the imager/printer, or the imager/printer may travel over the faxed document to be signed to a desired location for printing a previously stored or immediately executed signature of the sender and/or the receiver. The sender and/or receiver may also independently sign the printed image of the contract, agreement, understanding, or the like, at the each location, e.g., once for their signature to appear at the sending fax device 10 and a second time to provide their signature at the receiving fax device 10. Preferably, the CONTRACT mode may be configured to require the sender to sign the contract, agreement, understanding, or the like, first, and the receiver and/or other parties to subsequently sign the contract, agreement, understanding, or the like.

The video camera 50 and light 52 of a receiving fax device 10 are mounted on a moveable swivel, and feed their signals to the coder 28 and decoder 30 that sample the information received to the extent that high quality video imaging data is compressed by a compression unit and then transmitted via modem 70 to the transmitting fax device 10 when the transmitting fax device 10 is in the VAD mode. The modem 34 of the transmitting fax device 10 receives instructions from the CPU 38 of the transmitting fax device 10 to either maintain an open channel for the transmitting fax device 10 to view a fax transmission's coded video signals or, as in the case of a fax transmission being stored in a message buffer of a remote fax device 10, redials the receiving fax device 10 upon receiving a reply message that the receiving fax device 10 is ready to activate its printer 46 and print an image of the fax transmission. Upon receiving and after previewing the decoded and decompressed image of the fax transmission on the video display 54 of the transmitting fax device 10, a keyed approval or disapproval message is then entered on the operating panel 22 of the transmitting fax device 10, and a message is sent to the CPU 38 of the receiving fax device 10 indicating that the paper message in the sealed document reception holder can be released be released (electronically and or physically). Therefore, when the fax device 10 is in the VAD mode, the operator panel operable to dial a number of a remote fax device, and transmit a VIEW A DOCUMENT code with a fax transmission to activate a video camera on the remote fax device.

Fax device 10 is configured to effect secure document printing, reading, video camera scanning, and/or electronic or physical release functions. Upon physical release of fax transmission information by RAM 42 at the receiving fax device 10, the printer 46 selects a sheet of paper from a paper storage of the fax device 10. In the case of a laser printer, the print lasers statically charge the targeted sheet of paper. The print drive wheels then feed the statically charged sheet of paper over toner drum wheels which apply toner to the electrically charged portions of the sheet of paper. The sheet of paper is then fed into a sealed document reception holder with a transparent side facing upward. A light 52 mounted with the video camera 50 of the fax device 10 then illuminates the transparent side. The sheet of paper is then scanned by the video camera 50 which transmits an image of the printed sheet of paper back to the transmitting fax device 10 for review after coding and compressing the video signal to minimize transmission delays. Upon the receipt of a keyed message reply from the transmitting fax device 10, the printer 46 applies additional electrostatic charges and toner to the printed sheet of paper that corresponds with an approval or disapproval of the fax transmission by the sender of the fax transmission. After the last application of toner, the printed sheet of paper ejected from the fax device 10.

A sheet of paper that is to be scanned and faxed to other devices are fed into the fax device 10 via a document intake tray. Document intake rollers move the sheet of paper by document scanners 32 which optically scan the contents of the sheet of paper, convert the scanned image of the sheet of paper to digital form and then transmits the fax image data to the RAM 42 of a remote fax device 10 via modem 34. The scanned sheet of paper is then ejected from fax device 10 by fax document roller wheels. Upon receiving a message indicating that the remote fax device 10 has received the fax transmission in the transparent receiving tray, and that the image of the fax transmission is ready for review, the operator may view the image of the fax transmission on the attached video display 54.

Figure 3:
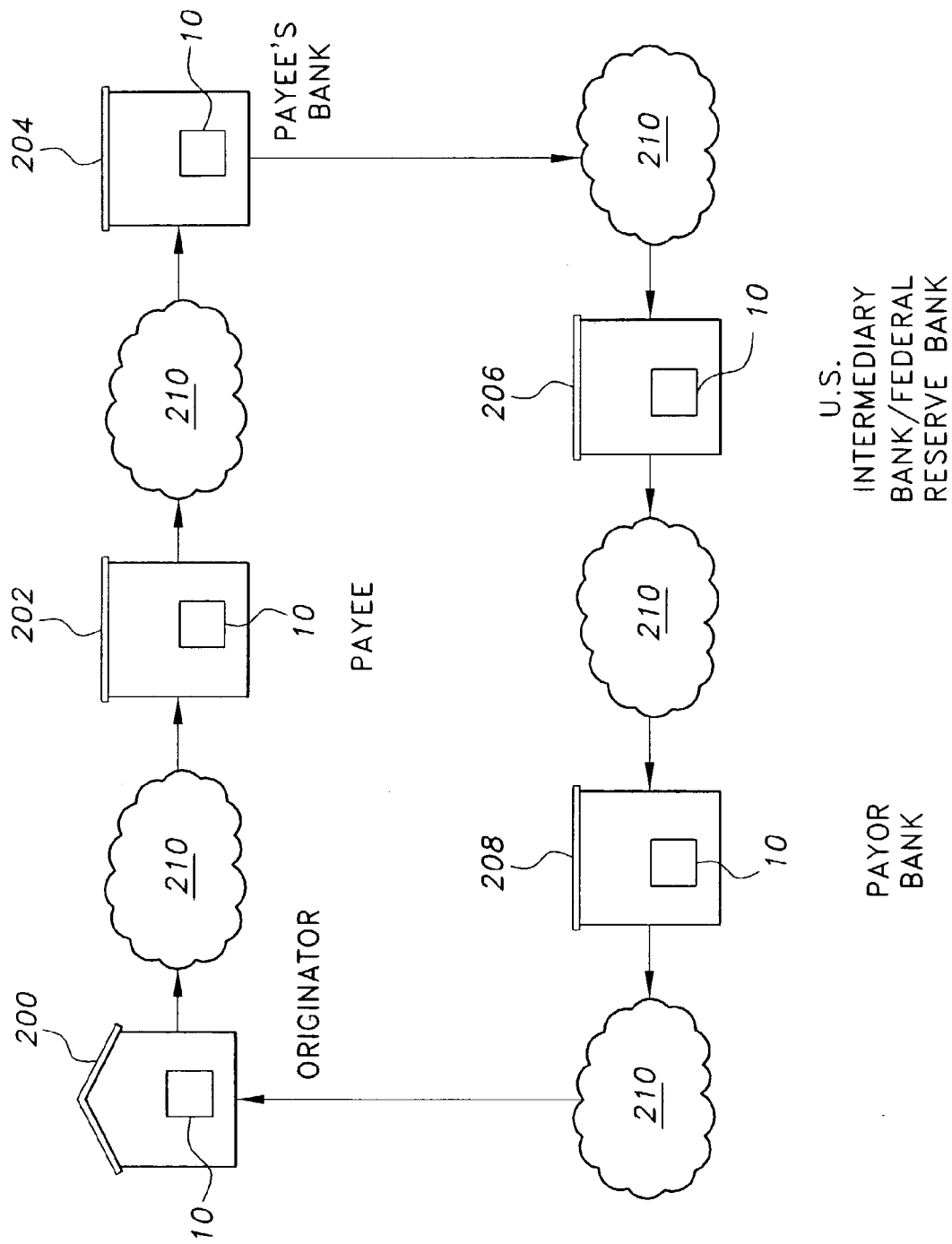
FIG. 3 is a diagram showing a method of using a fax device according to the present invention for transmitting checks.

FIG. 3 shows a diagram of a method of using a fax device 10 for transmitting checks. The sender or payor writes a check at their home or office location 200. Using fax device 10 the check is then transmitted over local telephone lines and the public switched network 210 to a corresponding fax device 10 located at the vendor or merchant's accounts payable location 202. Using fax device 10, the payor 200 confirms that an approved fax of his/her check has been properly transmitted to the payee 202, and electronically and/or physically releases the paper copy of the check from fax device 10's sealed document reception holder with an approval stamp. After receiving the approved faxed check the vendor or merchant properly endorses the faxed check and then faxes or deposits the endorsed faxed check to his bank 204 or the payor's bank 208 as the case may be for payment using a fax device 10 connected to either a private or the public switched telephony network 210 over voice telephone lines. If an intermediary or U.S. Federal Reserve Bank 206 is involved, the fax, view, approval and release process is the same when transmitting the endorsed, and then finally the cancelled check through the payor's bank 208 and then back to the sender or payor 200. In the case of check writers, vendors and banks that are connected to each other via private networks or data lines the procedure would not differ from the above.

A user intending to send a fax (sender) dials the fax number of a receiving fax device 10 and waits for the receiving fax device 10 to answer the sender's signal. Once the signal is confirmed the sender has several seconds to dial an extension number (recipient pass code). The recipient pass code is a number or identifier preassigned to a particular user of the receiving fax device 10.

The sender may dial a security pass code designated for a particular fax transmission after dialing the recipient pass code designating a recipient. The transmitted document is then not accessible without first entering both the recipient pass code and the security pass code. This security pass code is assigned by the sender of the document and is communicated to the recipient before the recipient may access the fax document. This enhances the security of the transaction.

Once the pass code and, optionally, the security code has been entered the sender transmits his/her fax document(s) (ordinarily by pressing the send button on the transmitter) and the fax document(s) is stored in a memory location designated for that particular pass code. If no pass code is received the transmitted document is held in a memory location designated for unassigned fax document(s). After the fax document(s) are sent the sender's fax device 10 prints a confirmation and terminates the call.

The transmitting fax device 10 may be configured to automatically assign a pass code to any sent document and transmit this code to the receiving fax device 10. The receiving fax device 10 then stores this code along with the faxed document. Additionally, the pass code may be printed in visible or invisible ink onto the face of all sent faxes along with other standard information such as a date, a receiver's fax number, a time, or the like.

CPU 38 waits for a ring tone and then attempts to establish communication with an external fax device 10. Once communication is established CPU 38 pauses for a predetermined amount of time and listens for a pass code. If a pass code is not received, CPU 38 assigns and stores the document in a general memory location. Any transmitted documents may be saved in this memory location and may be accessed by any user.

If a pass code is received and recognized, CPU 38 designates a registry in the memory for the user that corresponds to the pass code. If a security code is then received, CPU 38 blocks access to any information faxed following the security code. Any faxed documents are then stored in the previously created memory registry.

To retrieve an image of a fax transmission, a receiving party views video display 54 to determine whether a fax transmission has been received. A recipient pass code entered by the sender of the fax document may be converted into a text name by CPU 38. This information may be preprogrammed. For example, number 1254 may be converted into a position title, such as Docket Manager, or to a employee's name, such as Bob Smith.

If a fax transmission is present the receiving party then enters his/her recipient pass code, which may be verified by CPU 38. If any of the fax transmissions have security codes the receiving party may have to enter the security code for each secure document. If the recipient and/or security codes are accurate the receiving party may then request that the fax document be printed, or request that the fax transmission be forwarded to an interconnected computer. The fax transmission may be displayed on the video display 54 as a default.

A fax transmission may be retrieved through an external computer attached to a LAN or WAN. CPU 38 in fax device 10 communicates with a network hub through a network card inserted into fax device 10. From there messages may be routed to external computers. The procedure for checking for fax transmissions is the same as described above except that a receiving party at an interconnected computer would have the option of storing the fax document in the computer's memory, deleting, and/or printing the fax document from an interconnected printer.

Fax device 10 may also have remote access capabilities. A user may access fax device 10 from a remote location in order to forward fax transmissions in the memory or check on the status of fax transmissions sent to fax device 10.

Remote accessing of fax device 10 involves a remote access user (remote user) first calling fax device 10 and waiting for fax device 10 to attempt to establish a communications link. At this point the remote user may signal fax device 10 to cease attempts at establishing a communications link with a remote fax device 10 by pressing a predetermined key, such as the pound (#) key, or the like. A voice generator may then generate a voice options menu giving the remote user options to either enter a routing pass code or a security pass code. If a remote user selects to enter a security pass code, CPU 38 may verify the input pass code and, if authentic, provide to the remote user a copy of his/her intended secure mail.

If the remote user enters a pass code, CPU 38 may verify the code and relay to the remote user how many fax documents are present in memory assigned to that particular pass code. If a fax transmission is present the user may dial the number of a remote fax device 10. Fax device 10 then dials and sends any fax document(s) saved under that routing code to the remote fax device 10.

Fax device 10 also allows a fax sender to access a recipient fax device 10 in order to determine whether a particular fax transmission has been received and accessed by the intended recipient. This enables the sender to verify and confirm document retrieval on the recipient's fax device 10 by way of a muted ring. The sender may access the recipient, and discreetly verify not only that the fax transmission has been received, but also that the recipient has indeed retrieved the fax transmission. Since a passcode may be used on all private mail, fax device 10 may enable the sender to call the receiver's fax device 10, dial in the passcode plus a specified fax transmission number, and fax device 10 may confirm whether the fax transmission has been received, or is pending retrieval. This feature has value on all systems set up employing the teachings of the invention, and particularly in the case of intracompany correspondence. A visible or invisible transmission number may appear on the face of images of all outgoing fax transmissions, along with other standard information, such as the date, receiver's fax number, or the like.

When a sender of a fax transmission wants to verify whether a particular fax transmission has been received and accessed by the intended recipient, the sender makes a muted call from the transmitting fax device 10 to the receiving fax device 10. When communication between the transmitting and receiving fax devices 10 via a handshake protocol is established the sender enters the fax transmission number, and the fax transmission status may be retrieved, as well as a determination as to whether or not an image of the fax transmission has been retrieved by the recipient, or is still pending retrieval.

Securely faxing checks involves communication between a transmitting fax device 10 and a receiving fax device 10. Check paper may be used that contains nomenclature of a traditional check in addition to some unique features. The check paper may be the size of a full sheet of paper so as to be easily fed through a fax device 10. A bar code may run along one side of the check paper encoding a unique tracking number on printed checks. The tracking number may appear repeating alongside of the bar code.

A receiving fax device 10 monitors a communications line for incoming phone calls. A communications link is established upon receipt of an incoming phone call. If the transmitting fax device 10 is in a FAX A CHECK mode, it sends a fax-a-check signal which is detected by the receiving fax device 10. At that point the receiving fax device 10 removes a sheet of check paper from the auxiliary paper tray and positions it to be scanned by the bar code reader.

The bar code reader scans the check's bar code and thereby generates a tracking number which is sent back to the transmitting fax device 10. The receiving fax device 10 then waits a preselected amount of time to receive and verify the tracking number. If the tracking number is not received or verified before the expiration of a predetermined time limit the transaction is ended. If the tracking number is received and it matches the sent tracking number, the receiving fax device 10 sends back a signal instructing the transmitting fax device 10 to transmit the check. Any received fax transmission is held in memory, and a copy is returned to the transmitting fax device 10. The receiving fax device 10 then waits for a period of time for a print signal to be received from the transmitting fax device 10. If the signal is received the check is printed, if not the check is deleted from memory and the transaction is terminated. Also note the check could be printed under the glass for scrutiny prior to release.

To send a check a sender dials and establishes a communication link with the receiving fax device 10. The transmitting fax device 10 waits for a tracking number to be received. If no number is received in a predetermined amount of time the transaction is terminated. If the tracking number is received the number is displayed on video display 54. The user then types that tracking number into the operating panel 22 of the transmitting fax device 10 which initiates the transmission to the receiving fax device 10. If the number is verified, the receiving fax device 10 signals the transmitting fax device 10 to initiate transmission of the check. If the transmission is successful, the transmitting fax device 10 sends the check, prints a predetermined message, such as NON-NEGOTIABLE or the like, on the stub and/or the check, and the transaction is finalized.

While the invention has been described with references to its preferred embodiment, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

I claim:

1. A fax device comprising:
    a video camera operable to scan a printed document of a fax transmission;
    a signature touch pad operable to provide an electronic signature to a fax transmission;
    a reception container operable to receive a printed document of a received fax transmission, the reception container having a transparent cover and being sealed to users;
    a video display operable to display an image of a fax transmission before the fax transmission is released to an addressee of the fax transmission; and
    an operator panel operable to dial a number of a remote fax device, and transmit a View A Document code with a fax transmission to activate a video camera on the remote fax device.

2. The fax device according to claim 1, wherein the video display for the fax device is operable to display a fax transmission using split screen technology.

3. The fax device according to claim 1, wherein the video display for the fax device is operable to display a fax transmission after the fax transmission is transmitted by the fax device and before the fax transmission is printed.

4. The fax device according to claim 3, wherein the video display for the fax device is operable to display a fax transmission using split screen technology.

5. The fax device according to claim 1, wherein the signature touch pad is operable to provide an electronic signature to a fax transmission after the fax transmission is displayed and before the fax transmission is printed.

6. The fax device according to claim 1, wherein the signature touch pad is operable to provide an electronic signature to a fax transmission after the fax transmission is printed and before the fax transmission is physically released.

7. The fax device according to claim 1, wherein the video camera is mounted above the transparent cover of the reception container.

8. The fax device according to claim 1, wherein the operator panel of the fax device is further operable to transmit a VIEW A DOCUMENT code with a fax transmission to activate the video camera on the fax device.

9. The fax device according to claim 1, wherein the fax device is operable to dial a number of a remote fax device and send an approval/disapproval code on a fax transmission to cause printing of an approved/disapproved message on a face of a printed document of the fax transmission and ejection of the printed document from the remote fax device.

10. The fax device according to claim 1, wherein the fax device is operable to dial a number of a remote fax device and send an approval/disapproval code on a fax transmission to cause printing of an approved/disapproved message on a face of a printed document of the fax transmission and ejection of the printed document from the fax device.

11. The fax device according to claim 1, wherein the fax device is operable to compress, decompress, and transport a fax transmission received by the fax device to a video display of a fax device that provided the fax transmission.

12. The fax device according to claim 1, further comprising a computer interconnected with the fax device to enable electronic viewing of a fax transmission received by the fax device on the computer, and control of the fax device by the computer.

13. A fax system comprising a first fax device communicatively interconnected with a second fax device, said first fax device comprising:
    a video camera operable to scan a printed document of a fax transmission;
    a signature touch pad operable to provide an electronic signature to a fax transmission;
    a reception container operable to receive a printed document of a printed received fax transmission, the reception container having a transparent cover and being sealed to users; and
    a video display operable to display an image of a fax transmission before the fax transmission is released to an addressee of the fax transmission; and
    said second fax device comprising:
    a video camera operable to scan a printed document of a fax transmission;
    a signature touch pad operable to provide an electronic signature to a fax transmission;
    a reception container operable to receive a printed document of a received fax transmission, the reception container having a transparent cover and being sealed to users; and a video display operable to display an image of a fax transmission before the fax transmission is released to an addressee of the fax transmission;

wherein said first fax device controls functions of said second fax device when said first fax device sends a fax transmission to said second fax device, and said second fax device controls functions of the first fax device when said second fax device sends a fax transmission to said first fax device, and each of said first and second fax devices includes an operator panel operable to dial a number of a remote fax device, and transmit a VIEW A DOCUMENT code with a fax transmission to activate a video camera on the remote fax device.

14. The fax system according to claim 13, wherein the video display for either the first or second fax device is operable to display a fax transmission after the fax transmission is transmitted by the respective first or second fax device and before the fax transmission is electronically released.

15. The fax system according to claim 14, wherein the video display for either the first or second fax device is operable to display the fax transmission using split screen technology.

16. The fax system according to claim 13, wherein the video display for either the first or second fax device is operable to display a fax transmission after the fax transmission is electronically released by the respective first or second fax device and before the fax transmission is printed.

17. The fax system according to claim 16, wherein the video display for either the first or second fax device is operable to display the fax transmission using split screen technology.

18. The fax system according to claim 13, wherein the video display for either the first or second fax device is operable to display a fax transmission after the fax transmission is printed by the respective first or second fax device and before the fax transmission is physically released.

19. The fax system according to claim 18, wherein the video display for either the first or second fax device is operable to display the fax transmission using split screen technology.

20. The fax system according to claim 13, wherein the signature touch pad of either the first or second fax device is operable to provide an electronic signature to a fax transmission after the fax transmission is displayed and before the fax transmission is printed.

21. The fax system according to claim 13, wherein the signature touch pad of either the first or second fax device is operable to provide an electronic signature to a fax transmission after the fax transmission is printed and before the fax transmission is physically released.

22. The fax system according to claim 13, wherein the video camera of either the first or second fax device is mounted above the transparent cover of the reception container of the respective first or second fax device.

23. The fax system according to claim 13, wherein the operator panel for each of the first and second fax device is further operable to transmit a VIEW A DOCUMENT code with a fax transmission to activate the video camera on the associated first or second fax device.

24. The fax system according to claim 13, wherein each of the first and second fax device is operable to dial a number of a remote fax device and send an approval/disapproval code on a fax transmission to cause printing of an approved/disapproved message on a face of a printed document of the fax transmission and ejection of the printed document from the remote fax device.

25. The fax system according to claim 24, wherein the first and second fax device is further operable to dial a number of a remote fax device and send an approval/disapproval code on a fax transmission to cause printing of an approved/disapproved message on a face of a printed document of the fax transmission and ejection of the printed document from the respective first and second fax device.

26. The fax system according to claim 13, wherein each of the first and second fax device is operable to compress, decompress, and transport a fax transmission received by the respective first and second fax device to a video display of a fax device that provided the fax transmission.

27. The fax system according to claim 13, further comprising a computer interconnected with either the first or second fax device to enable electronic viewing of a fax transmission received by the respective first or second fax device on the computer, and control of the respective first or second fax device by the computer.

28. A method for viewing a fax document, the method comprising:

providing a first fax device with a video camera and a video display;

providing a second fax device with a video camera and a video display;

communicatively interconnecting the first fax device with the second fax device for a first transaction;

transmitting a first fax transmission from the first fax device to the second fax device, wherein said fax transmission includes transmitting a View A Document code with the first transmission to activate said video camera on said second fax device;

receiving the first fax transmission at the second fax device;

controlling the second fax device with the first fax device until the first transaction of transmitting the first fax transmission ends;

previewing an image of the first fax transmission on the video display of the first fax device; and electronically releasing the first fax transmission from the second fax device after previewing the image of the first fax transmission on the video display of the first fax device.

29. The method according to claim 28, wherein the step of previewing an image of the first fax transmission on the video display of the first fax device further comprises previewing the image of the first fax transmission on the video display of the first fax device using split screen technology.

30. The method according to claim 28, further comprising:

previewing an image of the first fax transmission on the video display of the second fax device after previewing an image of the first fax transmission on the video display of the first fax device and before electronically releasing the first fax transmission.

31. The method according to claim 30, wherein the step of previewing an image of the first fax transmission on the video display of the second fax device further comprises previewing the image of the first fax transmission on the video display of the second fax device using split screen technology.

32. The method according to claim 28, further comprising:

electronically signing the first fax transmission using the first fax device after previewing the image of the first fax transmission and before electronically releasing the first fax transmission.

33. The method according to claim 28, further comprising:
    printing an image of the first fax transmission at the second fax device after electronically releasing the first fax transmission;
    scanning the printed image of the first fax transmission with the video camera of the second fax device;
    displaying the scanned printed image of the first fax transmission on the video display of the first fax device; and
    physically releasing the scanned printed image of the first fax transmission from the second fax device after previewing the scanned printed image of the first fax transmission on the first fax device.

34. The method according to claim 33, wherein the step of displaying the scanned printed image of the first fax transmission on the video display of the first fax device further comprises displaying the scanned printed image of the first fax transmission on the video display of the first fax device using split screen technology.

35. The method according to claim 33, further comprising:
    displaying the scanned printed image of the first fax transmission on the video display of the second fax device after displaying the scanned printed image of the first fax transmission on the video display of the first fax device and before physically releasing the first fax transmission.

36. The method according to claim 35, wherein the step of displaying the scanned printed image of the first fax transmission on the video display of the second fax device further comprises displaying the scanned printed image of the first fax transmission on the video display of the second fax device using split screen technology.

37. The method according to claim 33, further comprising:
    electronically signing the first fax transmission using the first fax device after printing the image of the first fax transmission and before physically releasing the first fax transmission.

38. The method according to claim 33, further comprising:
    electronically signing the first fax transmission using the second fax device after printing the image of the first fax transmission and before physically releasing the first fax transmission.

39. The method according to claim 33, further comprising:
    printing an image of the first fax transmission at the first fax device after electronically releasing the first fax transmission;
    scanning the printed image of the first fax transmission with the video camera of the first fax device;
    displaying the scanned printed image of the first fax transmission on the video display of the first fax device; and
    physically releasing the scanned printed image of the first fax transmission from the first fax device after previewing the scanned printed image of the first fax transmission on the first fax device.

40. The method according to claim 39, wherein the step of displaying the scanned printed image of the first fax transmission on the video display of the first fax device further comprises displaying the scanned printed image of the first fax transmission on the video display of the first fax device using split screen technology.

41. The method according to claim 39, further comprising:
    displaying the scanned printed image of the first fax transmission on the video display of the second fax device after displaying the scanned printed image of the first fax transmission on the video display of the first fax device and before physically releasing the first fax transmission.

42. The method according to claim 41, wherein the step of displaying the scanned printed image of the first fax transmission on the video display of the second fax device further comprises displaying the scanned printed image of the first fax transmission on the video display of the second fax device using split screen technology.

43. The method according to claim 39, further comprising:
    electronically signing the first fax transmission using the first fax device after printing the image of the first fax transmission and before physically releasing the first fax transmission.

44. The method according to claim 39 further comprising:
    electronically signing the first fax transmission using the second device after printing the image of the first fax transmission and before physically releasing the first fax transmission.

45. The method according to claim 28, wherein the step of transmitting a first fax transmission further comprises:
    transmitting a VIEW A DOCUMENT code with the first fax transmission; and
    activating the video camera on the first fax device.

46. The method according to claim 28, wherein the step of transmitting a first fax transmission further comprises:
    transmitting an approval/disapproval code with the first fax transmission;
    printing an approved/disapproved message on a face of the scanned printed image of the first fax transmission; and
    ejecting the scanned printed image of the first fax transmission.

47. The method according to claim 28, further comprising:
    interconnecting a computer to the first fax device; and
    controlling functions of the first fax device with the computer.

48. The method according to claim 28, further comprising:
    communicatively interconnecting the second fax device with the first fax device for a second transaction;
    transmitting a second fax transmission from the second fax device to the first fax device;
    receiving the second fax transmission at the first fax device;
    controlling the first fax device with the second fax device until the second transaction of transmitting the second fax transmission ends;
    previewing an image of the second fax transmission on the video display of the second fax device; and
    electronically releasing the second fax transmission after previewing the image of the second fax transmission on the second fax device.

49. The method according to claim 48, wherein the step of previewing an image of the second fax transmission on the video display of the second fax device further comprises previewing the image of the second fax transmission on the video display of the second fax device using split screen technology.

50. The method according to claim 48, further comprising:
    previewing an image of the second fax transmission on the video display of the first fax device after previewing an image of the second fax transmission on the video display of the second fax device and before electronically releasing the second fax transmission.

51. The method according to claim 50, wherein the step of previewing an image of the second fax transmission on the video display of the first fax device further comprises previewing the image of the second fax transmission on the video display of the first fax device using split screen technology.

52. The method according to claim 48, further comprising:
electronically signing the second fax transmission using the second fax device after previewing the image of the second fax transmission and before electronically releasing the second fax transmission.

53. The method according to claim 48, further comprising:
electronically signing the second fax transmission using the first fax device after previewing the image of the second fax transmission and before electronically releasing the second fax transmission.

54. The method according to claim 48, further comprising:
printing an image of the second fax transmission at the first fax device after electronically releasing the second fax transmission;
scanning the printed image of the second fax transmission with the video camera of the first fax device;
displaying the scanned printed image of the second fax transmission on the video display of the second fax device; and
physically releasing the second fax transmission from the first fax device after previewing the image of the scanned printed image of the second fax transmission on the second fax device.

55. The method according to claim 54, wherein the step of displaying the scanned printed image of the second fax transmission on the video display of the second fax device further comprises displaying the scanned printed image of the second fax transmission on the video display of the second fax device using split screen technology.

56. The method according to claim 54, further comprising:
displaying the scanned printed image of the second fax transmission on the video display of the first fax device after displaying the scanned printed image of the second fax transmission on the video display of the second fax device and before physically releasing the second fax transmission.

57. The method according to claim 56, wherein the step of displaying the scanned printed image of the second fax transmission on the video display of the first fax device further comprises displaying the scanned printed image of the second fax transmission on the video display of the first fax device using split screen technology.

58. The method according to claim 54, further comprising:
electronically signing the second fax transmission using the second fax device after printing the image of the second fax transmission and before physically releasing the second fax transmission.

59. The method according to claim 54, further comprising:
electronically signing the second fax transmission using the first fax device after printing the image of the second fax transmission and before physically releasing the second fax transmission.

60. The method according to claim 48, further comprising:
printing an image of the second fax transmission at the second fax device after electronically releasing the second fax transmission;
scanning the printed image of the second fax transmission with the video camera of the second fax device;
displaying the scanned printed image of the second fax transmission on the video display of the first fax device; and
physically releasing the second fax transmission from the second fax device after previewing the scanned printed image of the second fax transmission on the first fax device.

61. The method according to claim 60, wherein the step of displaying the scanned printed image of the second fax transmission on the video display of the first fax device further comprises displaying the scanned printed image of the second fax transmission on the video display of the first fax device using split screen technology.

62. The method according to claim 60, further comprising:
displaying the scanned printed image of the second fax transmission on the video display of the second fax device after displaying the scanned printed image of the second fax transmission on the video display of the first fax device and before physically releasing the second fax transmission.

63. The method according to claim 62, wherein the step of displaying the scanned printed image of the second fax transmission on the video display of the second fax device further comprises displaying the scanned printed image of the second fax transmission on the video display of the second fax device using split screen technology.

64. The method according to claim 60, further comprising:
electronically signing the second fax transmission using the first fax device after printing the image of the second fax transmission and before physically releasing the second fax transmission.

65. The method according to claim 60, further comprising:
electronically signing the second fax transmission using the second fax device after printing the image of the second fax transmission and before physically releasing the second fax transmission.

66. The method according to claim 48, wherein the step of transmitting a second fax transmission further comprises:
transmitting a VIEW A DOCUMENT code with the second fax transmission; and
activating the video camera on the first fax device.

67. The method according to claim 48, wherein the step of transmitting a second fax transmission further comprises:
transmitting a VIEW A DOCUMENT code with the second fax transmission; and
activating the video camera on the second fax device.

68. The method according to claim 48, wherein the step of transmitting a second fax transmission further comprises:
transmitting an approval/disapproval code with the second fax transmission;
printing an approved/disapproved message on a face of the scanned printed image of the second fax transmission; and
ejecting the scanned printed image of the second fax transmission.

* * * * *